United States Patent

[11] 3,548,926

| [72] | Inventor | William E. Archer<br>Balboa Yacht Club, P.O. Box 552, Fort Amador, C.Z. |
|---|---|---|
| [21] | Appl. No. | 728,225 |
| [22] | Filed | May 10, 1968 |
| [45] | Patented | Dec. 22, 1970 |

[54] SCREW TYPE MATERIAL PROCESSOR
10 Claims, 6 Drawing Figs.

| [52] | U.S. Cl. | 165/87, 165/92 |
|---|---|---|
| [51] | Int. Cl. | F28f 5/06 |
| [50] | Field of Search | 165/87, 120, 92 |

[56] References Cited
UNITED STATES PATENTS

| 2,731,241 | 1/1956 | Christian | 165/87 |
| 2,321,185 | 6/1943 | Christian | 165/87 |
| 2,379,895 | 7/1945 | Feldstein | 165/92 |
| 2,624,552 | 1/1953 | Rose | 165/87 |
| 3,020,025 | 2/1962 | O'Mara | 165/87 |

FOREIGN PATENTS

| 256,037 | 5/1963 | Australia | 165/92 |

Primary Examiner—Meyer Perlin
Attorney—E. Wallace Breisch

ABSTRACT: A material processor for heating or cooling and mixing flowable material while conveying such material by means of a hollow-flight screw conveyor wherein the helical flights of the conveyor screw are made up of discrete segments of approximately 360° each.

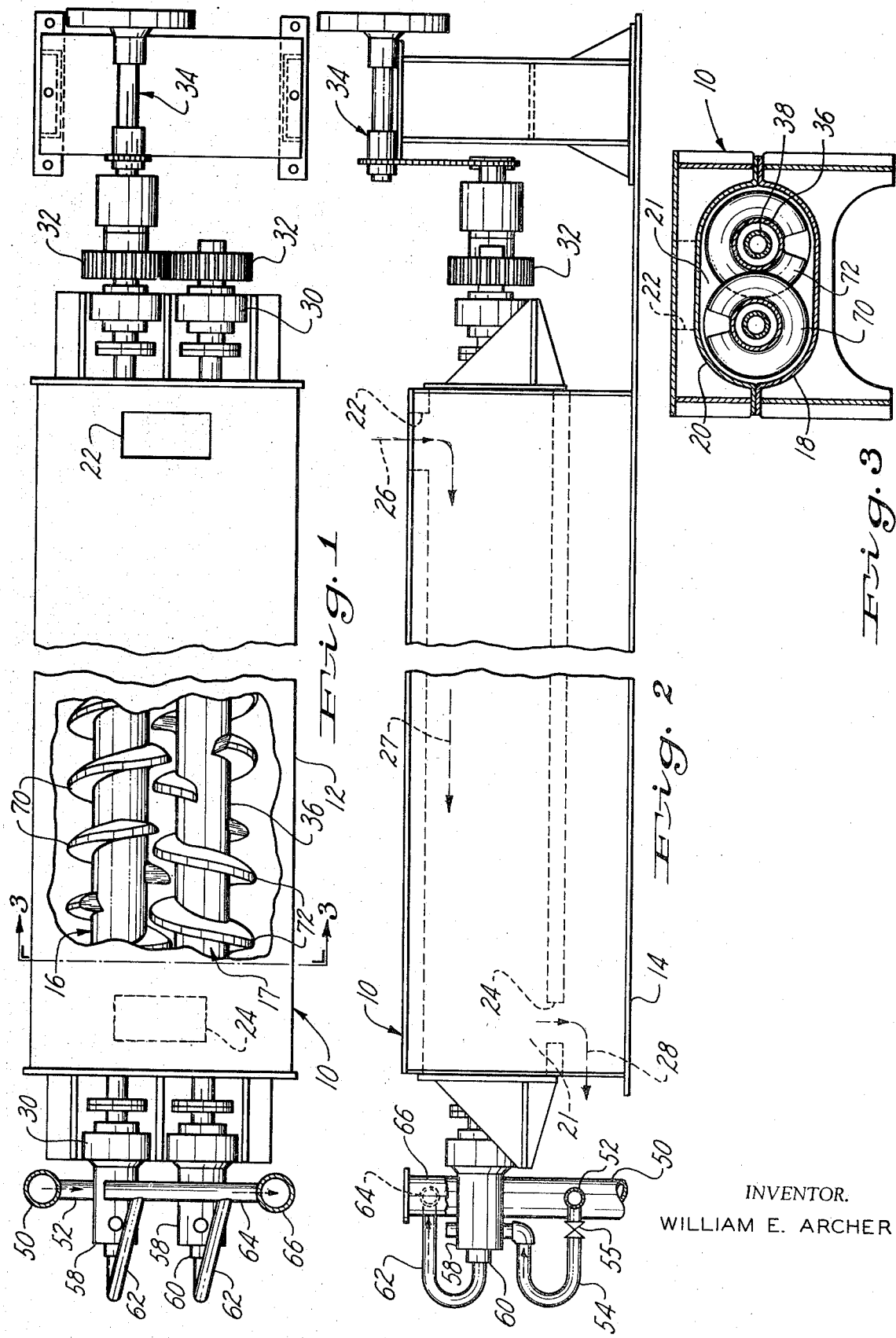

PATENTED DEC 22 1970

INVENTOR.
WILLIAM E. ARCHER

SCREW TYPE MATERIAL PROCESSOR

Hollow-flighted screw conveyor devices such as described and shown in U.S. Pat. No. 2,731,241 wherein hollow helical members, rotatably mounted in intermeshing relationship within a suitable trough, transfer material from an inlet portion to an outlet portion of the trough, while heating or cooling the material by heat exchange with a heat transfer medium conducted through the hollow flights, are well known in the art of material processing.

Such devices have served the purpose for which they are designed but have not been entirely satisfactory for the following reasons:

With certain material under certain conditions of moisture content, particle size or chemical nature the smooth conveying action of the prior art hollow-flighted conveyors causes the material to progress through the processor at a rate too great for accomplishing the desired mixing, drying or other treatment before discharge from the conveyor;

With some materials under certain conditions the continuous flighted conveyors of prior art allow the material to stick to the conveyor flights.

These and other difficulties inherent in the prior art hollow-flighted screw processors are minimized or completely overcome by the hollow-flighted screw processor of this invention wherein the helical flights made up of screw segments of approximately 360° separated from each other by a substantial gap between the ends of the flights so that, when material has progressed the length of one flight segment, the positive transport of the material is interrupted and the next segment of the helical flight then cuts the portion of material delivered by the first segment into approximately equal portions and again begins the transport of the material. Such stopping, and restarting of the conveying action and the cutting of the material gives the expected results of slowing the progress of the material through the processor to provide extra mixing and treating time as desired while at the same time providing unexpectedly large additional advantages of superior heat transfer as compared with prior art devices of this type, better mixing, and less sticking of the material to the processor flight.

These and other advantages of the segmented flight processor of this invention will become more apparent upon consideration of the following description and drawings in which:

FIG. 1 is a top plan view of a material processor constructed according to the principles of this invention having a portion of the outer casing broken away to show the segmented flights of this invention;

FIG. 2 is a side elevational view of the processor of FIG. 1;

FIG. 3 is a sectional view taken substantially on line 3-3 of FIG. 1 looking in the direction indicated by the arrows;

Figure 4:
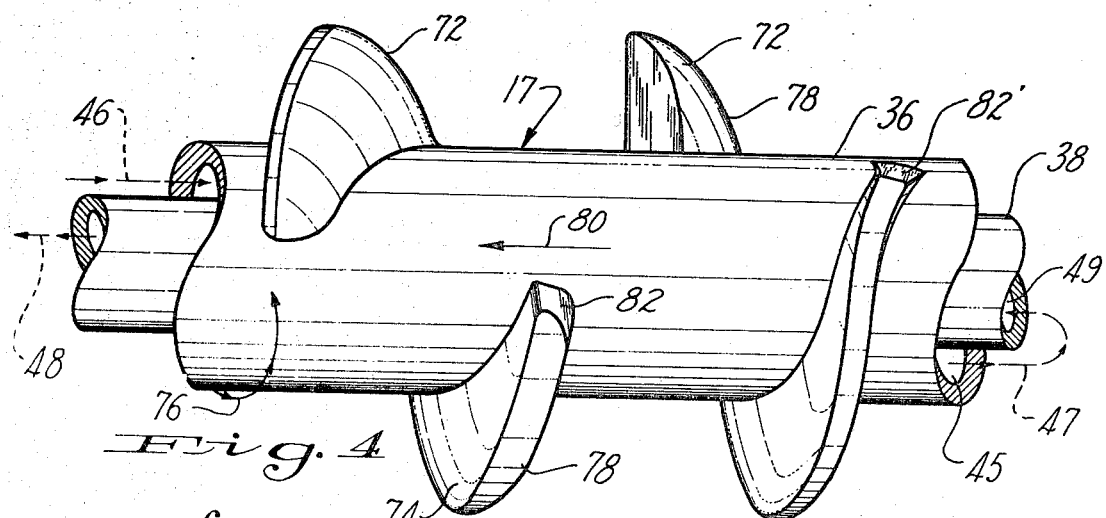
FIG. 4 is a fragmentary side elevational view on an enlarged scale of a conveyor screw constructed according to the principles of this invention.

In FIGS. 1, 2, and 3 there is shown a material processor 10 comprising a housing 12 having a base portion 14, supported as upon a floor or solid foundation, within which is mounted a pair of hollow-flighted conveyor screws 16 and 17 with right-hand and left-hand helical flights thereon, respectively. Troughed shrouds 18 and 20, lower and upper respectively, closely receive and surround the screws 16 and 17 with the upper shroud 20 inverted and mated with the lower shroud 18 to form a material-containing compartment 21 suitably communicating with a source of material to be processed (not shown) through a suitable inlet connection in the upper shroud 20 as indicated at 22 near the right-hand end of the housing 12 as seen in FIGS. 1 and 2 and having an outlet connection 24 at its lower left-hand end as seen in FIGS. 1 and 2. The outlet connection 24 suitably communicates with further processing equipment or a delivery system for the finished product (not shown). As shown by arrows 26, 27 and 28 the flow of material through the processor 10 is downward through the inlet connection 22, as by gravity feed, progressing from right to left as shown by the arrow 27 under action of the screws 16 and 17 and downward and outward through the outlet connection 24, again at least partially by gravitational action, as shown by the arrow 28.

The screws 16 and 17 are suitably journaled in extensions of the housing 12 as by suitable bearings 30 and are driven at identical speeds in a counterrotating relationship by a pair of gears 32 one of which is connected to a suitable source of power (not shown) as by suitable shaft and sprocket means 34 connected to drive one of the gears 32 in a manner well known in the art.

Figure 5:
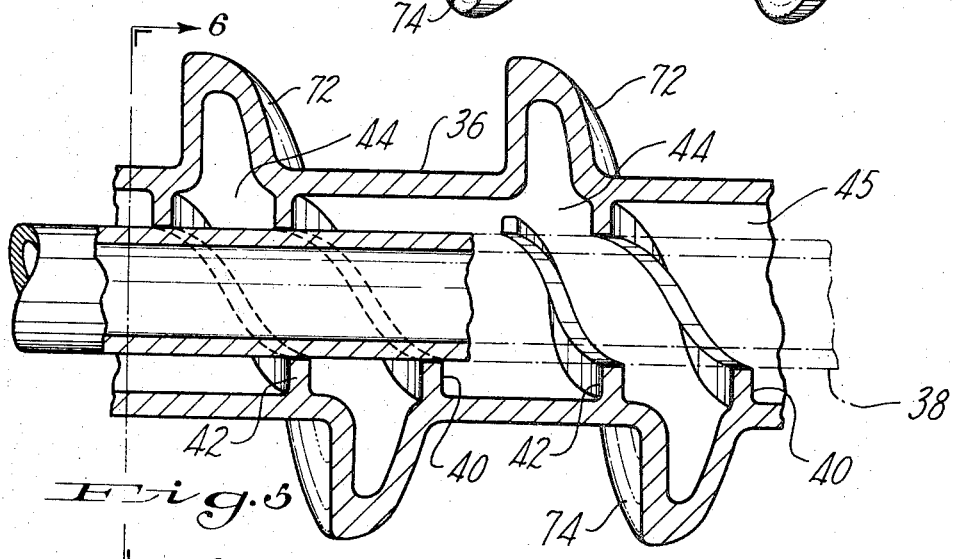
FIG. 5 is a median section of the conveyor screw of FIG. 4.
Figure 6:
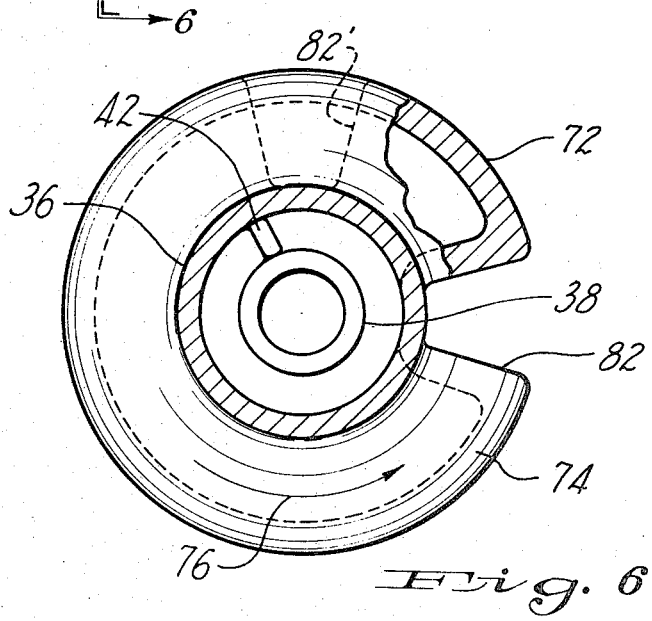
FIG. 6 is a sectional view taken substantially on line 6-6 of FIG. 5 looking in the direction indicated by the arrows.

In FIGS. 4, 5, and 6 there is shown on a larger scale a fragmentary portion of the left-hand flighted conveyor screw 17 comprising an elongated, generally cylindrical, hollow outer member or stem tube 36 maintained in coaxially spaced relationship with an inner tubular member or insert tube 38 with the tubes 36 and 38 held in coaxial suitably spaced relationship by spacer members 40 and 42 right-hand and left-hand members of spaced pairs as seen in FIG. 5 forming a channel 44 therebetween extending in helical manner at least partially about the exterior periphery of the insert tube 38 for a purpose to be hereinafter described.

As indicated by broken line arrows 46, 47 and 48 the relationship of the tubes 36 and 38 is such that a passageway is formed for a heat transfer element such as steam, hot water, cold water or other desirable transfer medium to travel through a passageway 45 between the tubes 36 and 38 from left to right for instance as shown by the arrow 46 to a point near the right-hand end of the screw 17 where openings in the insert tube 38 (not shown) permit flow of the heat exchange medium from the passageway 45 between the tubes into the interior 49 of the insert tube 38 as shown by the arrow 47 whereupon the insert tube 38 will conduct the heat exchange medium leftwardly to exit from the insert tube 38 as shown by the arrow 48. The connections for such supply and outlet of heat exchange medium may be seen in FIGS. 1 and 2 wherein a supply pipe 50 suitably connected to a source of pressurized fluid heat exchange medium (not shown) communicates with an inlet manifold 52 which in turn communicates through a pair of conduits 54 (only one of which is shown) having valves 55 therein which in turn communicate through suitable fluidtight rotary connections 58 with the passageways 45 within the screws 16 and 17, respectively. Thus fluid medium is supplied to the passageways 45 thereafter flowing into the passageways 49 and outwardly therefrom through fluidtight rotary connections 60 providing communication between the insert tube 38 and a fluid conducting conduit 62 for each of the screws 16 and 17. The conduits 62 communicate with an outlet manifold 64 which in turn communicates with an outlet pipe 66 to provide for outflow of the fluid heat exchange medium which can be returned through heat exchangers and suitable pumps and valves to supply pipe 50 in a closed circulation system or allowed to escape from the system in a manner well known in the art as may be dictated by the desirability of reusing or not reusing the fluid heat exchange medium.

It is to be noted that a more complete description and showing of the above described fluid circulation system is to be found in the aforementioned U.S. Pat. No. 2,731,241.

In FIGS. 1, 4, 5 and 6 there also appear helical elements 70 and 72 mounted upon and radially extending outward from the stem tubes 36 of the screws 16 and 17, respectively, with the elements 70 on the screw 16 having a right-hand helical lead while the elements 72 on the screw 17 have a left-hand helical lead and each of the screws 16 and 17 comprising a plurality of the elements 70 and 72 respectively.

By inspection of FIG. 3, particularly, it will be seen that the outward extension of the elements 70 and 72 is such that, when the screws 16 and 17 are suitably mounted in the processor 10, the screw elements overlap, with the elements 70 of the screw 16 nearly touching the stem tube 36 of the screw 17 and vice versa.

With particular reference to FIG. 5 it will be noted that helical elements 72 are hollow and formed integrally with the stem tube 36 of the screw 17 and that the spacer members 40 and 42 are so placed that the channel 44 forms a radially inwardly extending portion of the passageway within the hollow element 72 and that the spacer elements 40 and 42 prevent straight through flow of the incoming heat exchange medium as indicated by the arrow 46 and force the heat exchange medium to flow spirally about a portion of the insert tube 38 with the heat exchange medium in intimate thermal conducting contact with the interior of the successive helical elements. It will be noted that each helical element 72 has a forward face 74 to the left as viewed in FIGS. 5 and 6 for the purpose of pushing material in contact therewith when the screw 17 is rotating in the direction indicated by the arrow 76 which is the counterclockwise direction as viewed from the left-hand end of the screw as shown in FIGS. 4 and 5. Each element 72 has a curved rearward face 78 progressing from the outer edge of the forward face 14 down to outer the stem tube 36 to complete the outer surface of the helical elements 72 and is suitably curved to provide a reasonable amount of channel area within the elements 72 and to provide a smooth contour as an aid in cleaning the screw 17. Each helical element 72 is a discrete portion of an interrupted screw thread extending approximately the full length of the screw element 17 with gaps in both the circumferential and axial directions between successive ones of the elements 72 each of which encompasses approximately one turn of the periphery of the stem tube 36, actually shown in the preferred embodiment as about 330° of wrap angle. The orientation of the successive elements 72 taken in the direction of progress of the material being conveyed from right to left, as shown by the arrow 80 (see FIG. 4) is such that the leading edge 82 of the left end element 72 as shown in FIG. 4 is retarded, relative to the direction of screw rotation by an angle of approximately 90° from the leading edge 82' of the right end element 72 as shown in FIG. 4.

It is to be noted that the 330° of wrap around by the elements 72 and the 90° retarded orientation from one element 72 to the next element 72 in the direction of material feed are only preferred embodiments and the exact amount of wrap around and the amount of relative lag or lead in orientation of successive elements 72 is a matter of choice depending upon conditions such as the desired specific conveyance, the amount of mixing necessary, the moisture content and the physical nature of the material being processed. Variations in these conditions could well make other specific configurations desirable.

It is further to be noted that the formation of the helical elements 72 as integral parts of the stem tube 36 is unnecessary as long as the elements 72 are hollow and in good communication with the space 45 maintained between the interior of the stem tube 36 and the exterior of the insert tube 38. One such alternate method of fabrication would be to use a continuous stem tube 36 as a purely tubular member with hollow flights such as elements 72 welded on the outside of the stem tube with suitably placed openings communicating between the interior of the flights and the space 45.

It is evident that the screw 16 is formed in exactly the same manner as that hereinabove described for the screw 17 excepting only that the flights or helical elements 70 of the screw 16 have a right-hand spiral configuration so that when the screw 16 and 17 are counterrotated as by the gears 32 the elements 70 and 72 will form intermeshing screws with forward faces to the left as viewed in FIGS. 1, 4, and 5 and material progressing form right to left under impulses provided by the forward faces 74.

It is further to be noted that the principles of this invention can be practiced with a single conveyor screw closely received in a suitable troughed housing as well as by multiple screw devices comprising as many screws as desired.

When two or more screws are used it is possible to use intermeshing screws of the same hand, rotatable in a common direction to apply the principles of this invention.

Operation of the material processor 10 of this invention begins with the supplying of a pressurized fluid heat exchange medium such as hot water to the manifold 52 from the supply pipe 50, with the water flowing through the conduits 54 and the rotary inlet connections 58 into the passageways 45 between the interior of the stem tube 36 and the exterior of the insert tube 38. With the water under pressure, it is forced to flow through channels 44 and the interior of the successive helical elements 72 and 70 to approximately the right-hand end of the screws 16 and 17 where it flows through openings in the insert tubes 38 and following the interior passageways 49 of the insert tube 38 exits from the screw 16 and 17 through the rotary connections 60, the conduits 62, the manifold 64 and the outlet pipe 66 to be reheated and returned to the screws 16 and 17 in a well known manner or otherwise disposed of as may be desirable. As more completely described in the above cited U.S. patent the shrouds 18 and 20 may be heated or cooled as desired by being used as the inner portions of a more or less extensive water jacketing surrounding the shrouds 18 and 20 in a well known manner.

With the screws 16 and 17 at the desired temperature power means (not shown) is activated through the shaft and sprocket means 34 to rotate the screws 16 and 17 at the desired speed in the proper counter rotating direction so that the forward faces 74 of the helical elements 70 and 72 progress from right to left as viewed in FIG. 1. Flowable material to be processed is introduced through the inlet connection 22 into the compartment 21 and coming into contact with the first elements 70 and 72 at the right-hand end of the screws 16 and 17, respectively, a first batch of the material is urged forwardly by positive conveying action, that is to the left along the screws 16 and 17, by the action of the first element 70 and the first element 72 through approximately one turn of the screws. Thereafter the positive conveying action is interrupted because of the gap between the trailing edge of the right-hand element 72 and leading edge 82 of the next helical element 72 in the leftward direction. During this first period of conveying, heat is being transferred from the heat surfaces of the first helical element 72 and the outer surface of the stem tube 36 to the material in a well-known manner. When the positive conveying action is interrupted the first batch of material tends to pause in its axial progress for a short length of time, except for the displacement action of a second batch of material being positively conveyed by the first elements 70 and 72 pushing the first batch in the forward direction, until the leading edge 82 of the second element 72 comes into contact with an intermediate portion of the first batch of conveyed material at which time the first batch is divided into approximately equal portions and further positive conveying of the forward portion of the first batch recommences with the rearward portion of that batch being added to a second batch of material now being conveyed by the first helical element 72. Thus, throughout the time of material progressing from the inlet 22 to the outlet 24 there is a series of actions described by the following:

Step 1. Positively conveying a batch of flowable material for a first period of time along a trough by contact with a first hollow helical element having a heat exchange medium therein;

Step 2. Transferring heat between the heat exchange medium and the batch material through contact with inner and outer surfaces of the helical element, respectively;

Step 3. Interrupting the positive conveying action on said batch for a second period of time during which only displacement moves said batch;

Step 4. Reinstituting the positive conveying action on a portion of said batch for a period of time substantially equal to the first period of contacting a second of the helical elements through substantially one turn of the second element;

Step 5. Interrupting positive conveying action for a period of time substantially equal to the second period of time; and repeating the positive conveying and displacement steps for a predetermined number of times for the desired heat transfer after which continuously removing such material from the casing.

Although the above process has been described in terms of the structure herein shown and described, other structures for practicing the method of this invention are envisioned.

In watching the operation of a processor such as that above described it is interesting to note that a plug or batch of material extending from one flight to the next is moved forward by positive conveying action in a fashion similar to the action of any normal screw conveyor until the gap in the flights is reached, at that point the batch of material slows in its forward translation although still being displaced in the forward direction by material later introduced into the inlet connection 22 and at this time being conveyed by the first helical element. Thus interruption of conveying action indicates only that positive conveying by mechanical means has been interrupted with consequent slowing of axial translation of the material. The leading edge of the next flight segment will then split this plug of material approximately in half with the forward half again moving forward, under positive conveying action, as it is captured between flight faces. This cutting and folding action undoubtedly contributes much of the additional heat transfer obtained from this unit. In addition, the large number of blunt leading edges cutting through the material causes a vertical turbulence and mixing action which is quite beneficial.

It is to be noted that the gaps between the helical elements 70 or 72 lower the rate of specific conveyance through the processor of this invention so that there is more time for heat transfer between the processor 10 and the material passing therethrough than for a similar prior art continuous screw conveyor operating at the same number of revolutions per minute with the same pitch screw. This added time is beneficial in that it increases the amount of heat transfer possible at a given number of revolutions per minute which at the same time the interrupted flight design of this conveyor adds to the mixing and folding action within the processor 10.

This invention having been described and shown in a preferred embodiment it is to be realized that variations in the application of the principles of this invention are to be expected. It is therefore respectfully requested that this invention is to be interpreted as broadly as possible and limited only by the claims appended thereto.

I claim:

1. In a heat exchange device comprising an elongated material confining casing having a material inlet adjacent one end and a material outlet adjacent the other end thereof, at least one hollow shaft mounted in said casing for rotation in a given direction said shaft having helical conveying means thereon closely received within said casing, said helical means being hollow and having the interior thereof in communication with the interior of said shaft for the passing of a fluid heat exchange medium therethrough, the improvement comprising: said helical means being formed in segments, each of said segments extending through substantially one helical turn about said shaft and the ends of successive ones of said segments being spaced apart both axially and circumferentially on said shaft and communicating seriatim with other of said segments through said shaft.

2. The heat exchange device as set forth in claim 1 wherein said segments are circumferentially spaced by an angular spacing of substantially 90° in a direction opposite said given direction of rotation as measured between successive leading edges in the direction from said inlet toward said outlet.

3. The heat exchange device as set forth in claim 2 wherein said at least one hollow shaft is a plurality of hollow shafts located so that said helical means of adjacent shafts are in radially overlapping relationship for simultaneous rotation.

4. The heat exchange device as set forth in claim 1 wherein said at least one shaft is a plurality of shafts similarly having helical conveying means thereon.

5. The heat exchange device as set forth in claim 4 wherein said plurality of shafts is a pair of shafts having said helical conveying means of one of said shafts of opposite hand from the helical conveying means of the other of said shafts and located in radially overlapping relationship for simultaneous counter rotation.

6. In a method of thermally conditioning of flowable material by continuously supplying such material to a casing member defining an elongated material-confining path having an elongated material-conveying member therein, conveying such material longitudinally through said casing member while simultaneously transferring heat between said material and a fluid heat exchange medium circulating through at least one of said members and continuously removing said material from said casing, the improvement consisting of: initially conveying said material in a given direction through a first elongated portion of said path by direct engagement with said material-conveying member; conveying said material, immediately subsequent to said initial conveying, through a second portion of said path by displacement only of said material in said given direction; conveying said material in said given direction, immediately subsequent to said conveying by displacement, through a third portion of said path by direct engagement with said material-conveying member.

7. The method of thermally conditioning material as specified in claim 6 wherein said conveying by direct engagement is continued for a first period of time, and said conveying by displacement is continued for a second period of time shorter than said first period.

8. The method of thermally conditioning material as specified in claim 7 wherein said conveying by direct engagement subsequent to said conveying by displacement is continued for a third period of time substantially equal to said first period.

9. The method of thermally conditioning material as specified in claim 6 wherein said conveying by direct engagement subsequent to said conveying by displacement begins with a cutting and folding action applied to said material.

10. The method of thermally conditioning material as specified in claim 6 wherein said last-mentioned conveying by direct engagement is followed by a plurality of alternating successive conveying steps of displacement and direct engagement.